United States Patent [19]

Kordesch

[11] 3,849,201
[45] Nov. 19, 1974

[54] ANODE AND SENSING CELL FOR HYDRAZINE FUEL CELL

[75] Inventor: Karl V. Kordesch, Lakewood, Ohio

[73] Assignee: Union Carbide Corporation, New York, N.Y.

[22] Filed: Mar. 23, 1972

[21] Appl. No.: 237,510

Related U.S. Application Data

[60] Continuation of Ser. No. 871,321, Oct. 30, 1969, abandoned, which is a division of Ser. No. 659,154, Aug. 8, 1967, abandoned.

[52] U.S. Cl. .............................. 136/86 B, 204/195
[51] Int. Cl. ......................................... H01m 27/12
[58] Field of Search .... 136/86 D, 86 R, 86 E, 86 B; 204/195, 1 T, DIG. 3

[56] References Cited
UNITED STATES PATENTS 2,851,654  9/1958  Haddad.............................. 204/195
3,291,753  12/1966  Thompson ....................... 136/85 D Primary Examiner—A. B. Curtis
Assistant Examiner—H. A. Feeley
Attorney, Agent, or Firm—John R. Doherty

[57] ABSTRACT

The disclosure describes a sensing cell which monitors hydrazine concentration in the fuel cell electrolyte by detecting the potential difference between (i) an anode which forms part of a complete circuit including a load and (ii) a reference anode, both anodes being in contact with the electrolyte. Also described is a hydrazine fuel cell which includes the improved anode and/or the sensing cell.

5 Claims, 6 Drawing Figures

ANODE AND SENSING CELL FOR HYDRAZINE FUEL CELL

PRIOR APPLICATIONS

This application is a continuation of the earlier prior application Ser. No. 871,321, filed Oct. 30, 1969, which in turn is a division of the earlier prior application Ser. No. 659,154, filed Aug. 8, 1967, both now abandoned.

The present invention relates to fuel cells which employ hydrazine as a fuel. More particularly, the invention is directed to an improved sensing cell for detecting hydrazine concentration, and to a hydrazine fuel cell system which contains the sensing cell.

Fuel cells which employ hydrazine as a fuel have been known for several years. Such fuel cells generally comprise an anode capable of reacting electrochemically with hydrazine with the production of electric current (hereinafter referred to as a "hydrazine anode"), a cathode to which is supplied the oxidant employed in the fuel cell, an electrolyte in contact with the electrodes, means for supplying oxidant to the cathode and means for supplying hydrazine to the anode. The usual method for supplying hydrazine to the anode is by dissolving the hydrazine in the electrolyte, preferably an aqueous alkaline electrolyte.

Prior art hydrazine anodes typically comprised a porous metal or other porous material which was capable of promoting electrochemical decomposition of hydrazine in contact with the anode, for example, porous nickel or porous Raney nickel. In addition, catalytic materials were often deposited on the porous material, generally metals or compounds of metals from Group VIII of the Periodic Table, for example, the noble metals or heavy metal borides such as nickel boride or cobalt boride.

Palladium was the most commonly used noble metal catalyst for hydrazine anodes. However, the palladium catalyst tended to lose its catalytic activity unless the hydrazine concentration in the electrolyte in contact with the anode was greater than 2 per cent by weight. This relatively high hydrazine concentration was objectionable because a certain amount of reaction takes place between the oxidant cathode and the hydrazine (even where diffusion barriers are used) which tends to reduce the overall potential of the cell. In practice, it is desirable to maintain the hydrazine concentration in the electrolyte as low as is electrochemically feasible and in any event lower than 1 weight percent.

On the other hand, the noble metals platinum and rhodium exhibited good catalytic properties when used on hydrazine anodes in that they permitted electrochemical decomposition of hydrazine and very low concentrations. However, the disadvantage of these metals was that, because of their high catalytic activity, they also catalyzed the non-electrochemical decomposition of hydrazine directly into nitrogen and hydrogen, which resulted in low efficiency in consumption of the hydrazine fuel.

Present methods for monitoring the hydrazine concentration in the electrolyte of a hydrazine fuel cell operate as follows: the total output voltage of the fuel cell battery is monitored and a change in this voltage actuates an electrical switch opening an electromagnetic fuel valve and introducing hydrazine into the electrolyte system. The prime disadvantage of this method is that the net battery voltage invariably includes the cathode potential which tends to vary with time and operating conditions. Also, should there be an over-injection of hydrazine into the system in response to a drop in total battery voltage due, for example, to a slowdown in the electrolyte pumping system or air cooling system, the hydrazine monitoring and injecting system would be unable to recover because of the tendency to inject even more hydrazine to compensate for the decreased voltage, resulting eventually in complete flooding of the system with the hydrazine fuel.

Separate monitoring means for controlling hydrazine concentration which are independent of the main fuel cell battery voltage have also been suggested since such means are not subject to the cumulative effect of a sudden drop in total battery voltage described above. However, such separate monitoring devices, typically a single anode-single cathode hydrazine fuel cell, have a very low sensitivity because the change in voltage with hydrazine concentration for a single cell is relatively small compared to the total battery voltage.

The present invention provides an improved hydrazine anode which is not subject to the disadvantages of prior art anodes as outlined above. The present invention also provides a hydrazine sensing cell which is highly efficient and overcomes the problems of prior art devices.

The hydrazine anode of the present invention comprises a porous solid material having deposited thereon as a catalyst a mixture of palladium with rhodium and/or platinum, the metal catalyst mixture comprising from 5 to 95 weight percent palladium and from 95 to 5 weight percent of rhodium, platinum or mixtures thereof.

The hydrazine sensing cell of this invention comprises a first hydrazine anode in contact with a hydrazine-containing electrolyte and through which current flows when the sensing cell is in operation, a second hydrazine anode in contact with the hydrazine-containing electrolyte, means for measuring the potential difference between the first anode and the second anode, and means for adding hydrazine to the electrolyte in response to changes in the potential difference. The first and current carrying anode is the "loaded" or "working" anode, while the second anode, which carries only an insignificant current, is the "reference" anode.

Figure 1:
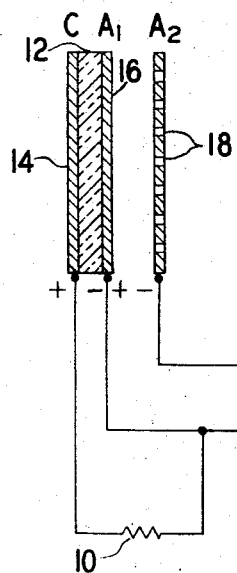
FIGS. 1, 3, 5 and 6 are schematic drawings of four embodiments of the hydrazine sensing cell of this invention.

In preparing the hydrazine anodes of the present invention, any of the porous solid materials normally used in constructing fuel cell electrodes can be employed, for example, porous carbon, porous nickel, porous Raney nickel or mixtures of these materials.

The mixture of catalytic metals can be conveniently applied to the porous solid material by immersing the solid material in an aqueous solution containing salts of palladium and of rhodium and/or platinum, and thereafter heating the so-treated material to temperatures of 150° C. to 200° C. to decompose the metal salts and deposit the catalytic metals on and within the porous structure. Heating for periods of 12 to 16 hours is generally satisfactory, and the heating step can be carried out in air or in an inert atmosphere.

Non-porous solid materials can be employed in a similar manner, if hydrazine anodes of lower efficiency can be tolerated.

The hydrazine anodes of this invention have the unexpected property that the palladium metal catalyst does not show the slow but steady loss of catalytic activity which plagued prior art electrodes when low hydrazine concentrations were used. In order to avoid this slow deactivation, it was previously necessary to have the hydrazine concentration in the electrolyte in the range of 2 to 5 weight percent. The palladium in the mixture of palladium with rhodium and/or platinum in the anodes of the present invention retains its high catalytic activity over periods of 500 hours or longer without noticeable loss of activity even though hydrazine concentrations as low as 0.2 weight percent are employed. This advantage of the anodes of the present invention is realized even in electrodes where the catalyst mixture comprises 95 weight percent palladium and only 5 percent of rhodium and/or platinum.

Within the broad ranges for the catalyst metal mixture in the anodes of this invention the ratios of the individual elements are not critical. Similarly, the total amount of metal catalyst is not critical; trace amounts are sufficient to give catalytic activity, while no significant advantage is obtained by using relatively large amounts of catalytic metals. However, the most efficient electrodes are obtained when the catalyst mixture comprises from 80 to 20 weight percent palladium and from 20 to 80 weight percent of rhodium, platinum or mixtures thereof, and when the catalytic metals are present in a total amount in the range of 0.5 to 2.0 milligrams per square centimeter of electrode surface.

An additional advantage of the hydrazine anodes of the present invention is found in a mixture of palladium with rhodium, rather than palladium with platinum. With the palladium-rhodium combination, each complete shut-down of the hydrazine battery (which causes the anode to reach oxygen potential due to the action of air) restores any small loss of activity resulting from long term operation. This behavior is the opposite of the behavior of palladium metal alone which tends to lose activity during battery shut-down. This reactivation (which may involve an oxidation reaction) does not generally take place with the palladium-platinum mixture, and accordingly, the palladium-rhodium hydrazine anodes of this invention are preferred.

The following examples further illustrate the hydrazine anodes of this invention and methods for preparing them.

EXAMPLE 1

A solution was prepared by dissolving 9.8 grams of rhodium chloride and 1.3 grams of palladium chloride in 20 milliliters of water, the ratio (by weight) of rhodium to palladium in this solution being 80 to 20. 1 milliliter of this solution and 7 milliliters of isopropyl alcohol were mixed and painted onto the surface of a porous nickel plaque measuring 15 centimeters by 12.5 centimeters. The alcohol helps to promote even distribution of the catalyst solution and uniform wetting of the porous surface. The electrode was then heated at 150° C. for 16 hours.

EXAMPLE 2

Other hydrazine anodes of this invention were prepared using stock solutions comprising (a) 4.8 grams of rhodium chloride, 12.8 grams of palladium chloride, and 16 milliliters of concentrated hydrochloric acid dissolved in 40 milliliters of water, the ratio (by weight) of rhodium to palladium being 20 to 80 and (b) 25 grams of platinum chloride, 25 grams of palladium chloride and 100 milliliters of water, the ratio (by weight) of platinum to palladium being 50 to 50. One milliliter portions of these stock solutions were diluted with water-isopropanol (50 volume percent each) mixtures and applied to the surfaces of 150 cm. square porous nickel electrodes which were then heated at about 150° C. overnight.

EXAMPLE 3

Hydrazine anodes of this invention were compared with prior art hydrazine anodes of the same dimensions under identical conditions in operating hydrazine-oxygen fuel cells using aqueous potassium hydroxide electrolytes containing 0.3 weight percent dissolved hydrazine. The results were as follows:

A. Prior art anode: Porous nickel plaque 35 mils thick catalyzed with palladium metal at a concentration of one milligram per square centimeter of electrode surface.

| Time | Anode Voltage vs. $H_2$ Electrode | Current Density (ma/cm$^2$) |
| --- | --- | --- |
| Start | −0.020 | 50 |
| After 3 hrs. | +0.030* | 50 |
| After 8 hrs. | +0.130* | 50 |

*The less positive voltage represents a higher overall battery voltage based on hydrazine anode vs. oxygen cathode.

When exposed to air this anode completely lost its activity and was unable to recuperate.

B. Anode of this invention: Porous nickel plaque 35 mils thick catalyzed with a mixture of palladium and rhodium (Pd to Rh ratio of 80 to 20) at a concentration of one milligram of Pd-Rh mixture per square centimeter of electrode surface.

| Time | Anode Voltage vs. $H_2$ Electrode | Current Density (ma/cm$^2$) |
| --- | --- | --- |
| Start | −0.040 | 50 |
| After 3 hrs. | 0.00 | 50 |
| After 8 hrs. | +0.020 | 50 |
| After 80 hrs., 10 exposures to air and 10 recuperations | +0.020 | 50 |

When exposed to air, this anode lost its activity only temporarily and regained its activity when the fuel cell was returned to operating conditions. This anode was subjected to 10 exposures to air and 10 recuperations over an 80 hour period without loss of efficiency.

The hydrazine sensing cell of this invention is useful in a wide variety of embodiments depending, for example, upon the general type of hydrazine fuel cell battery, whether the battery is intended for portable or stationary operation and whether or not electric power (other than power obtained from the battery) is available. Several illustrative embodiments of the sensing cell are shown in the drawings.

The sensing cell shown schematically in FIG. 1 comprises a first (working) hydrazine anode A1 and a second (reference) hydrazine anode A2, both of these anodes being in contact with the fuel cell electrolyte which contains dissolved hydrazine. Anode A1 is part of a complete electrical circuit which comprises cathode C and load resistance 10. Anode A1 and cathode C are preferably separated by a spacer 12 which is saturated with the fuel cell electrolyte. Spacer 12 can be constructed from ionically conductive materials, such as asbestos, and provides a barrier to gross contact of the hydrazine-containing electrolyte with the cathode C. Air or oxygen is supplied to the gas face 14 of cathode C, and hydrazine in the electrolyte is supplied to electrolyte face 16 of anode A1. The electrolyte flows freely around anode $A_2$ and enters the perforations 18 in anode $A_2$. Anode A1 can be also perforated, if desired. The spacer 12 serves to keep hydrazine away from the cathode while completing the electrical circuit by means of the electrolyte absorbed therein. The air or oxygen cathode can be any of the cathodes known in fuel cell technology, for example, those described in Electrochemical Technology, Vol. 3, No. 5-6, May-June 1965, pages 166-171. Similarly, the hydrazine anodes A1 and A2 can be any of the prior art hydrazine anodes or the improved hydrazine anodes of this invention. The hydrazine anodes of this invention are preferred because of their high sensitivity in the presence of hydrazine concentrations in the electrolyte of less than one weight percent.

Operating (in the electrical circuit) anode A1 and reference anode A2 (which carries only an insignificant current) are connected to a device 20 which measures the potential difference between A1 and A2 and in turn operates a hydrazine injection mechanism (not shown) for adding hydrazine to the electrolyte system in response to changes in the measured potential difference. The device for measuring the potential difference between A1 and A2 and for actuating the hydrazine injection mechanism can be, for example, a contact millivolt meter, a millivolt recorder or a servo-amplifier system.

Figure 2:
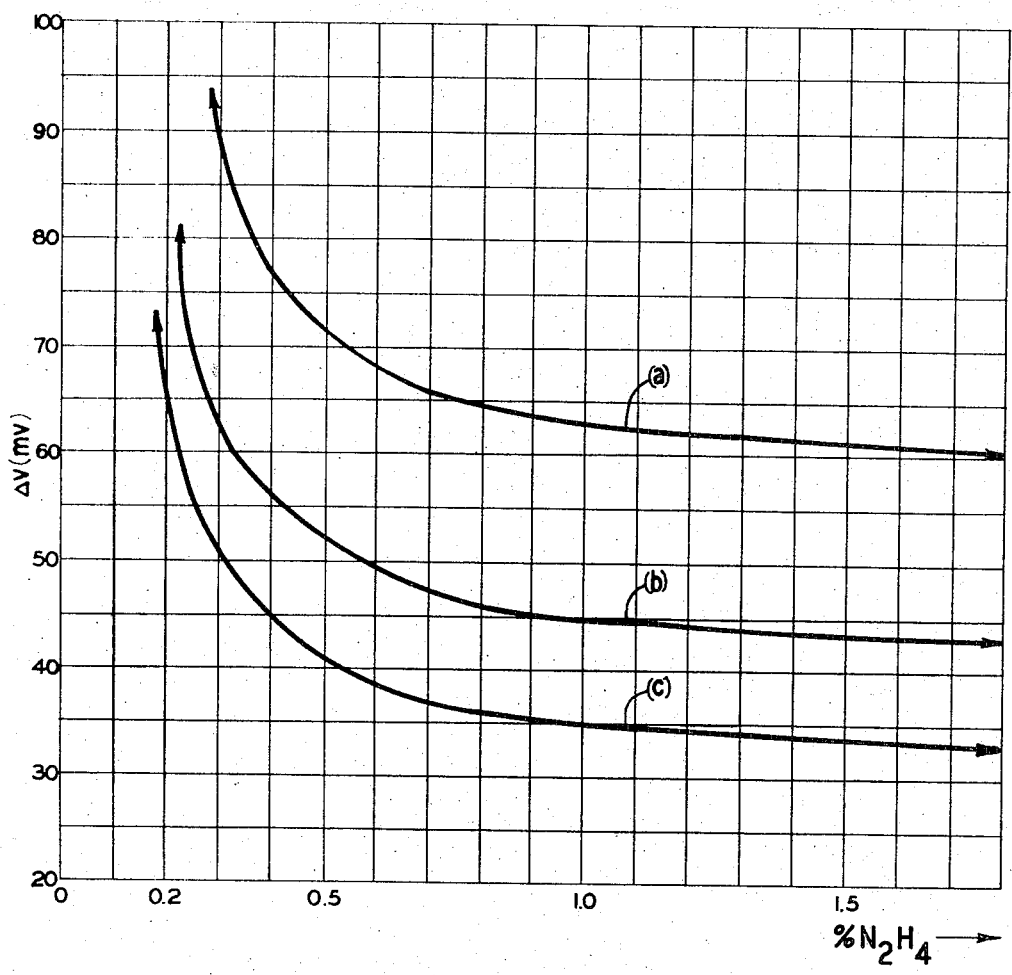
FIGS. 2 and 4 are plots of the voltage difference between the two anodes as a function of electrolyte hydrazine concentration obtained with the sensing cell circuits of FIGS. 1 and 3, respectively.

FIG. 2 shows the potential difference in millivolts between working and reference anodes when a sensing cell of the type shown in FIG. 1 was used in a hydrazine-air fuel cell system in which the electrolyte was 7.5-7.7 normal aqueous potassium hydroxide and the anode A1 was operating at a current density of 50 milliamperes per square centimeter. The sensing cell was separated from the multi-cell hydrazine battery stack and was located in the circulating electrolyte system between the electrolyte pump and the main fuel battery structure. Curves (a), (b) and (c) represent data obtained at electrolyte temperatures of 37°–40° C., 47°–50° C. and 55°–57° C., respectively.

The data of FIG. 2 show that the sensing cell of FIG. 1 is highly sensitive to changes in hydrazine concentration in the desirable range of 0.2 to 0.5 weight percent dissolved hydrazine in the electrolyte. However, the location of the potential difference-hydrazine concentration curve is affected by changes in the operating temperature of the fuel cell battery, primarily because the conductivity of the electrolyte is temperature dependent.

Figure 3:
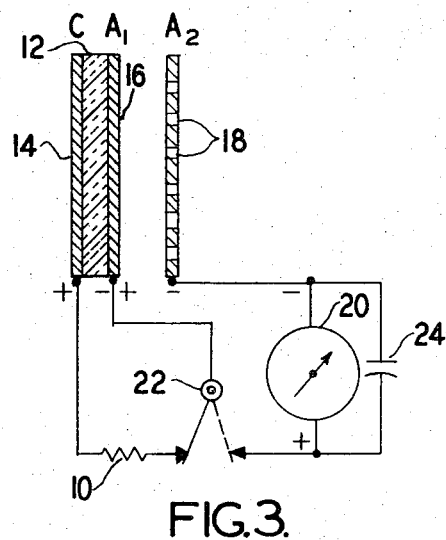
Figure 5:
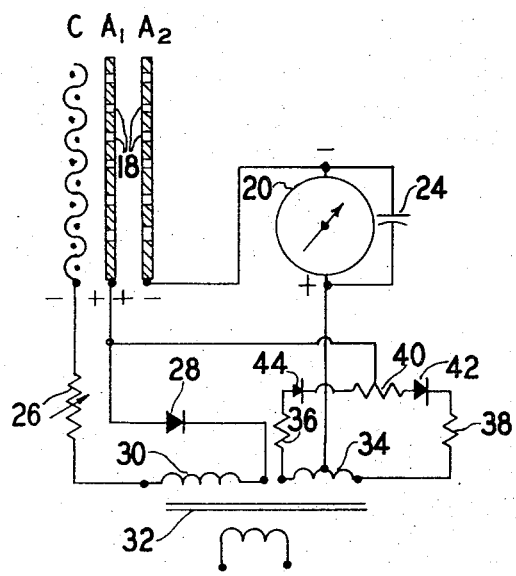
Figure 6:
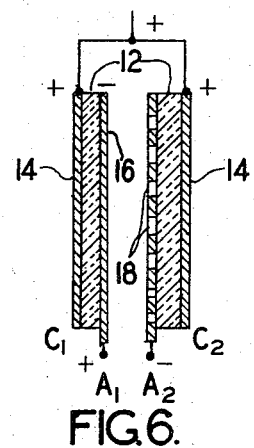

Additional embodiments of the sensing cell of this invention are shown in FIGS. 3, 5 and 6. In these figures the reference numerals 10 through 20 designate structural elements generally similar to those discussed in detail with reference to FIG. 1. FIG. 3 shows an embodiment in which the sensing cell includes an interrupter circuit which permits the elimination of the electrolyte resistance of the cell and, accordingly, eliminates to a large extent the temperature dependence of the anode potential difference-hydrazine concentration curves. In the embodiment of FIG. 3, a pulse load is applied between cathode C and anode A1 by means of a current interrupter 22, while the potential difference between anode A1 and anode A2 is measured (during the no-load periods) free of the ohmic resistance of the electrolyte by means of a potential difference detector 20 in parallel with capacitor 24. Such interrupter circuits, both mechanical and electronic, are described in detail in an article by K. Kordesch and A. Marko in the J. Electrochem. Soc., 107, 480 (1960). Circuit interrupter 22 can be a vibrator switch which typically operates at a frequency of about 100 cycles per second.

Figure 4:
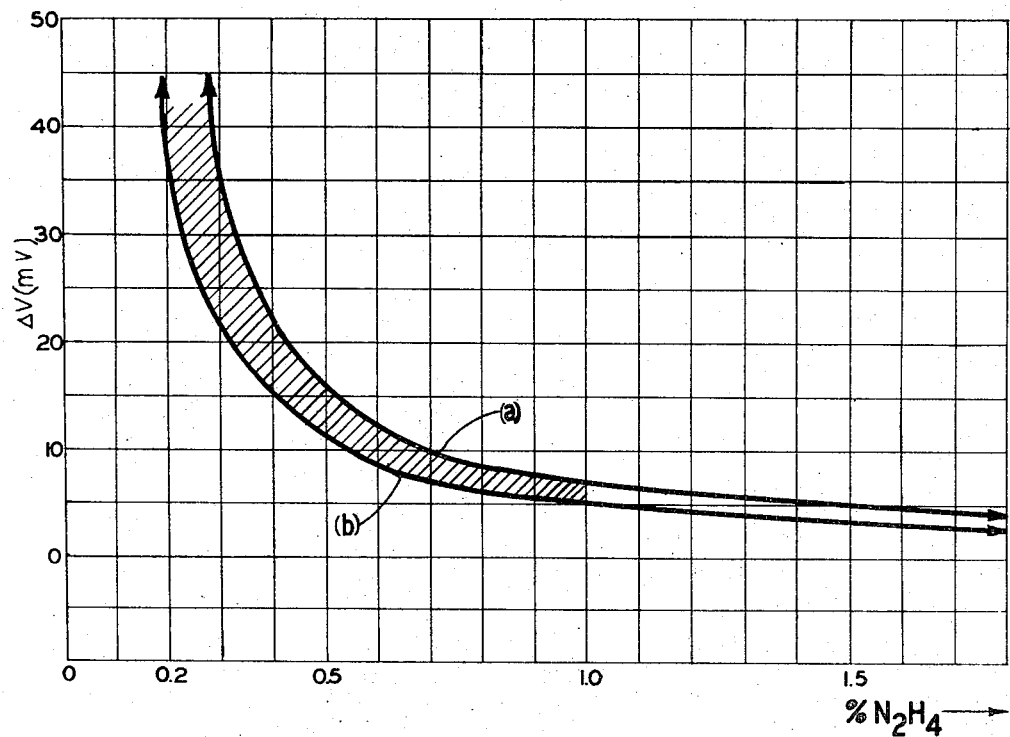

FIG. 4 shows a set of curves of the potential difference in millivolts between the working and reference anodes of a sensing cell used with a hydrazine-air fuel cell battery under the same conditions as those described with reference to FIG. 2 except that a sensing cell of the type shown in FIG. 3 was employed. Curve (a) in FIG. 4 represents data obtained at 35° C. and curve (b) data at 57° C. The curves of FIG. 2 and FIG. 4 are plotted on the same scale, and it is apparent that the variations in the resistance of the electrolyte introduced by varying temperature and electrolyte concentration are eliminated to a large extent. A close band of characteristic curves, designated by the shaded area between curves (a) and (b), is obtained. The stability of the characteristic curves is particularly improved in the region of 0.2 to 0.5 weight percent hydrazine concentration which is the most desirable operating range for the fuel cell.

FIG. 5 illustrates an embodiment of the sensing cell of this invention which is adapted for operation where an external source of electric current, other than the fuel cell itself, is available. In the embodiment of FIG. 5 the oxygen or air electrode and the spacer 12 are eliminated and a metal screen serves as the cathode. The fuel cell electrolyte is in contact with the cathode screen and perforated anodes A1 and A2. Anode A1 is in a circuit which includes screen cathode C, variable resistance 26, diode rectifier 28, and secondary winding 30 of transformer 32. The potential difference detector 20 is connected to a gating circuit which includes transformer secondary winding 34, resistances 36, 38 and 40, and diode rectifiers 42 and 44. During operation of this sensing cell some hydrogen evolution takes place at the screen cathode.

The sensing cell embodiment of FIG. 5 is completely independent of the use of an air or oxygen cathode. The characteristic curves of potential difference between working anode A1 and reference anode A2 as a function of hydrazine concentration are substantially identical with those shown in FIG. 4.

FIG. 6 shows another embodiment in which two air or oxygen cathodes C1 and C2 are connected together thus reducing the effective current density on each cathode to one-half that of working anode A1. This is desirable because it prolongs the life of the cathodes and provides a more stable voltage level. Appropriate leads are connected to the cathodes, current carrying anode A1 and reference anode A2 to complete sensing cell circuits similar to those of FIG. 1 or FIG. 3.

A hydrazine fuel battery made up of a number of individual fuel cell units (each unit comprising an air cathode and a hydrazine anode) and designed to operate at a total output of 800 watts was equipped with a hydrazine sensing cell of this invention having the general structure of the embodiment shown in FIG. 1, the cell being located in the circulating electrolyte at a point between the circulation pump and the main fuel cell battery. The potential difference detector in this sensing cell was a relay circuit (including an amplifier) which was connected to a solenoid valve for injecting hydrazine into the electrolyte. The battery operated with widely fluctuating loads of from essentially no load to 50 milliamperes per square centimeter of geometrical electrode surface area for a period of greater than 400 hours, demonstrating excellent regulation of hydrazine concentration as a function of battery output.

What is claimed is:

1. In combination with a hydrazine fuel cell battery comprising at least one hydrazine anode, at least one oxidant cathode and an electrolyte in contact with said anode and cathode and containing dissolved hydrazine; a device for controlling the hydrazine concentration in said electrolyte, said device comprising, in combination; a sensing cell operably independent from said fuel cell battery, said sensing cell comprising a first (working) hydrazine anode through which current flows when said device is in operation, a second (reference) hydrazine anode and an oxidant cathode, said first and second anodes and said cathode being in contact with said hydrazine-containing electrolyte; means for measuring the potential difference between said first anode and said second anode; a spacer between said cathode and said first anode for preventing gross contact of hydrazine with said cathode; a load resistance connected across said cathode and said first anode and means for adding hydrazine to said electrolyte in response to changes in said potential difference.

2. The combination in accordance with claim 1 wherein the first anode in said sensing cell forms a complete electrical circuit with the oxidant cathode and a load resistance, and the current flowing through said first anode is provided by the fuel cell comprising said first anode, said cathode, and said hydrazine-containing electrolyte.

3. The combination in accordance with claim 1 wherein the current flowing through the first anode of said sensing cell is provided by a source external to said sensing cell.

4. The combination in accordance with claim 1 which includes means in circuit with the first anode and the second anode in said sensing cell for eliminating the ohmic resistance component of said fuel cell electrolyte when the potential difference between the first anode and the second anode is measured.

5. The combination in accordance with claim 1 wherein said hydrazine anodes comprise a porous solid material having deposited thereon a mixture of metals comprising from 5 to 95 weight percent palladium and from 95 to 5 weight percent rhodium and/or platinum.

* * * * *